Aug. 29, 1939. O. I. PRICE Re. 21,189
REFRIGERATING APPARATUS
Original Filed April 20, 1925 5 Sheets-Sheet 1
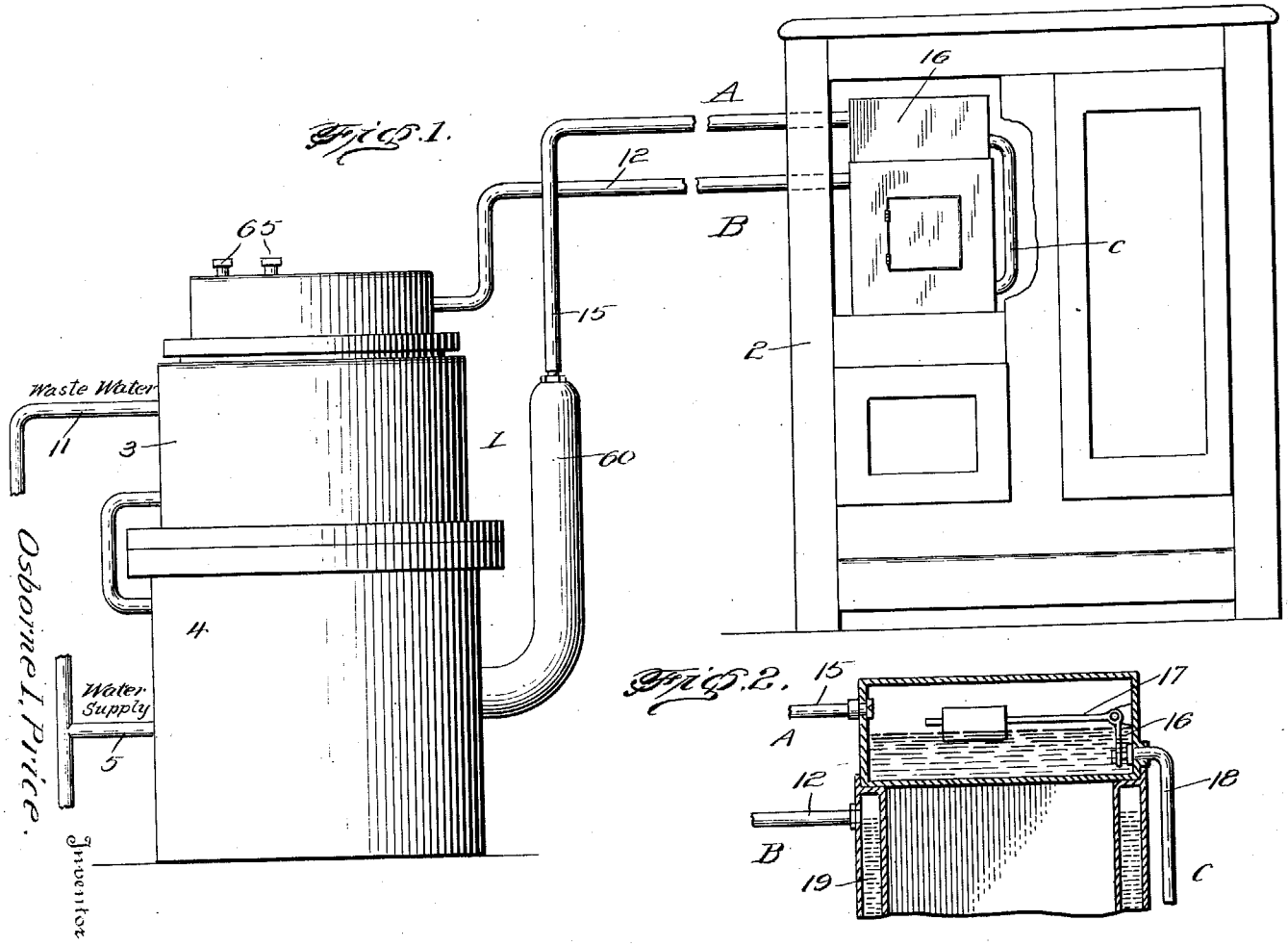

Aug. 29, 1939. O. I. PRICE Re. 21,189
REFRIGERATING APPARATUS
Original Filed April 20, 1925 5 Sheets-Sheet 2
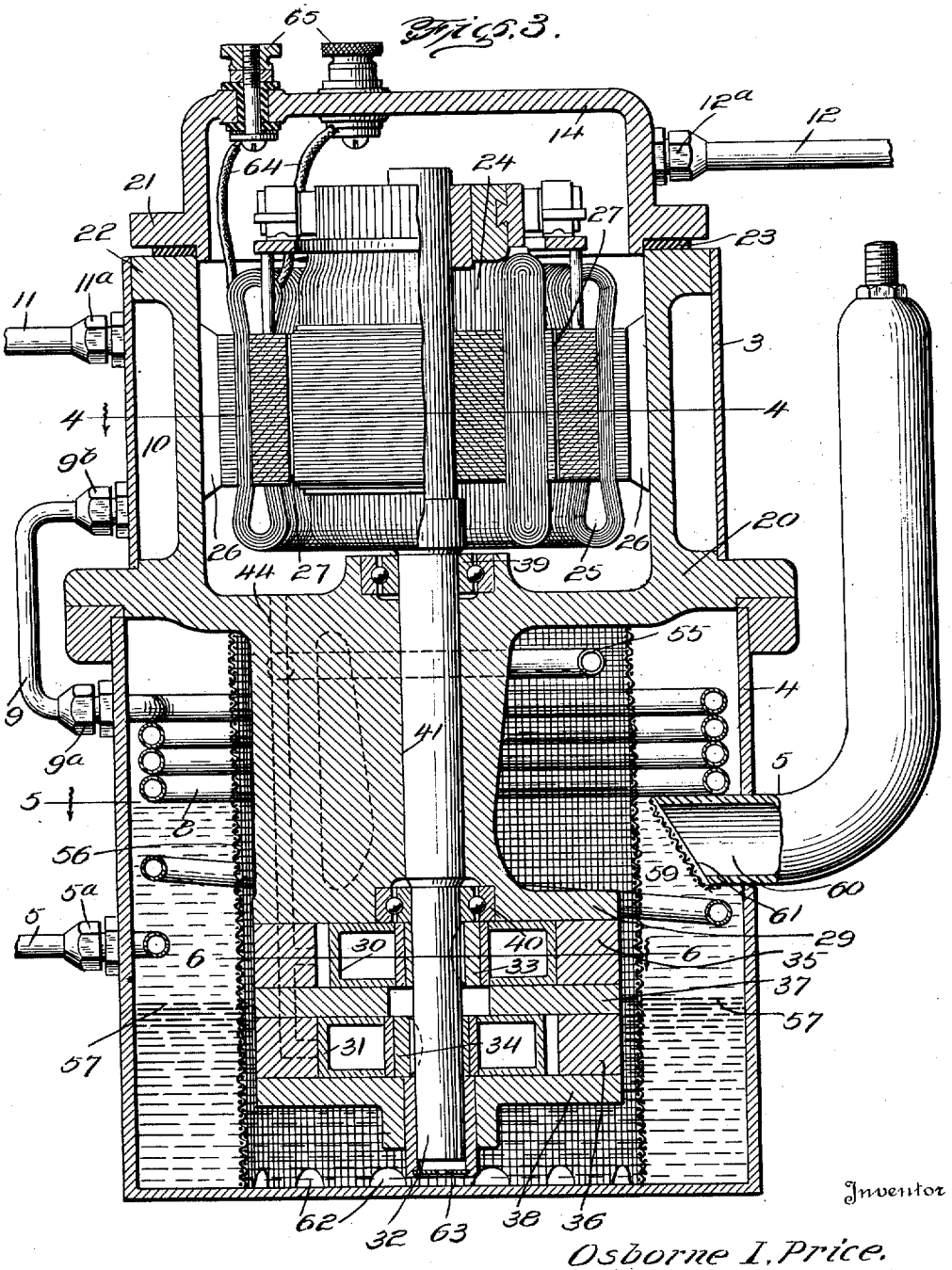
Inventor
Osborne I. Price.
By John B. Brady
Attorney Aug. 29, 1939. O. I. PRICE Re. 21,189

REFRIGERATING APPARATUS

Original Filed April 20, 1925 5 Sheets-Sheet 3

Inventor

Osborne I. Price.

By John B. Brady

Attorney

REFRIGERATING APPARATUS

Original Filed April 20, 1925 5 Sheets-Sheet 4

Inventor
Osborne I. Price.

By John B. Brady
Attorney

Aug. 29, 1939. O. I. PRICE Re. 21,189

REFRIGERATING APPARATUS

Original Filed April 20, 1925 5 Sheets-Sheet 5

Inventor
Osborne I. Price.

By John C. Brady.
Attorney

Reissued Aug. 29, 1939

Re. 21,189

UNITED STATES PATENT OFFICE 21,189

REFRIGERATING APPARATUS

Osborne I. Price, Frederick, Md., assignor to Westinghouse Electric & Manufacturing Company, a corporation of Pennsylvania Original No. 1,807,871, dated June 2, 1931, Serial No. 24,599, April 20, 1925. Renewed October 28, 1930. Application for reissue June 15, 1939, Serial No. 279,380

12 Claims. (Cl. 62—115)

Figure 4:
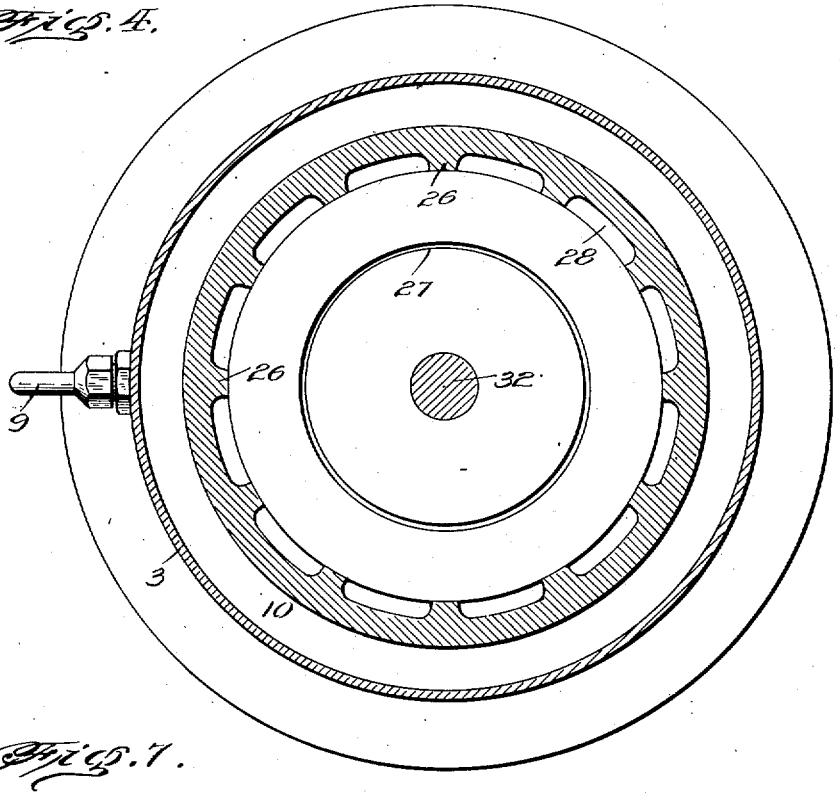

My invention relates broadly to refrigeration machines, and more particularly to a simplified construction of refrigeration apparatus having parts arranged for manufacturing inexpensively on a quantity production basis.

One of the objects of my invention is to provide an apparatus for a refrigeration system which may be constructed in different capacities for household and domestic use, or for commercial refrigeration systems of larger size, the general arrangement of parts for the various capacity machines varying for the installation of different capacity.

Another object of my invention is to provide a construction of refrigeration apparatus which is particularly adapted for domestic use by reason of its small physical dimensions, its constant operation over long periods of time at low maintenance expense, and its freedom from disagreeable and obnoxious gases which heretofore have been a source of danger by the injury of food products in domestic systems.

Still another object of my invention is to provide a construction of refrigeration apparatus in which all the moving parts are disposed within separate containers joined to form housings for the apparatus which may be conveniently mounted with respect to the usual ice box in the home and connected with cooling means within the ice box, for maintaining the foodstuffs at a constant cold temperature.

Another object of my invention is to provide a construction of refrigeration apparatus where the danger of leakage of the refrigerant is eliminated by dispensing with conventional stuffing box connections or packing between the high and low pressure portions of the apparatus and providing continuous passages interconnecting the several portions in such manner that the passage of the refrigerant is constantly confined.

Another object of my invention is to provide a construction of refrigeration apparatus wherein the parts may be readily cast to form a rugged unit including a low pressure compartment which comprises the housing of the driving motor, and a high pressure compartment in which is situated a pump or compressing mechanism driven by the said motor with the parts so arranged that leakage of the refrigerant between the different portions of the apparatus is substantially eliminated.

Still another object of my invention is to provide a construction of self-lubricating refrigeration apparatus whereby lubricant is forced through the apparatus in a continuous cycle during the running period, by the operation of the moving parts.

My invention further resides in the construction and assembly of a compressor and driver for refrigeration systems arranged to occupy a relatively small physical area and having high and low pressure compartments with a driving mechanism forming part of one of the compartments and a compressing mechanism in the other of the compartments, the compressing mechanism being arranged to deliver the refrigerant under pressure into the last mentioned compartment with means for cooling the refrigerant and delivering the same to the freezing system.

Figure 7:
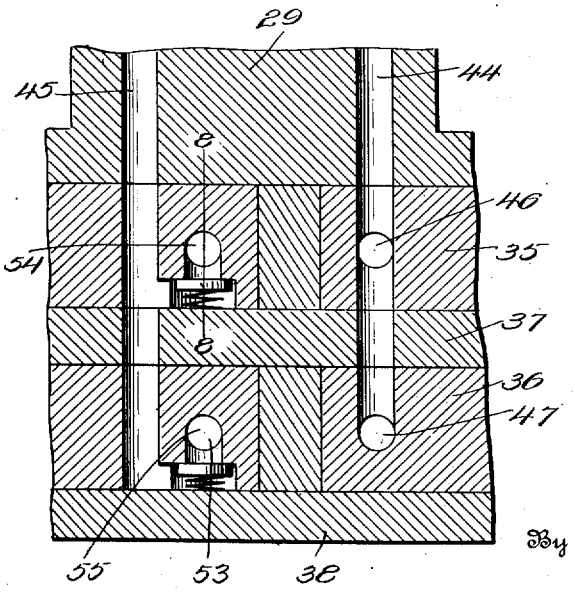
Figure 8:
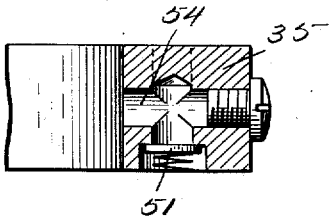
Figure 5:
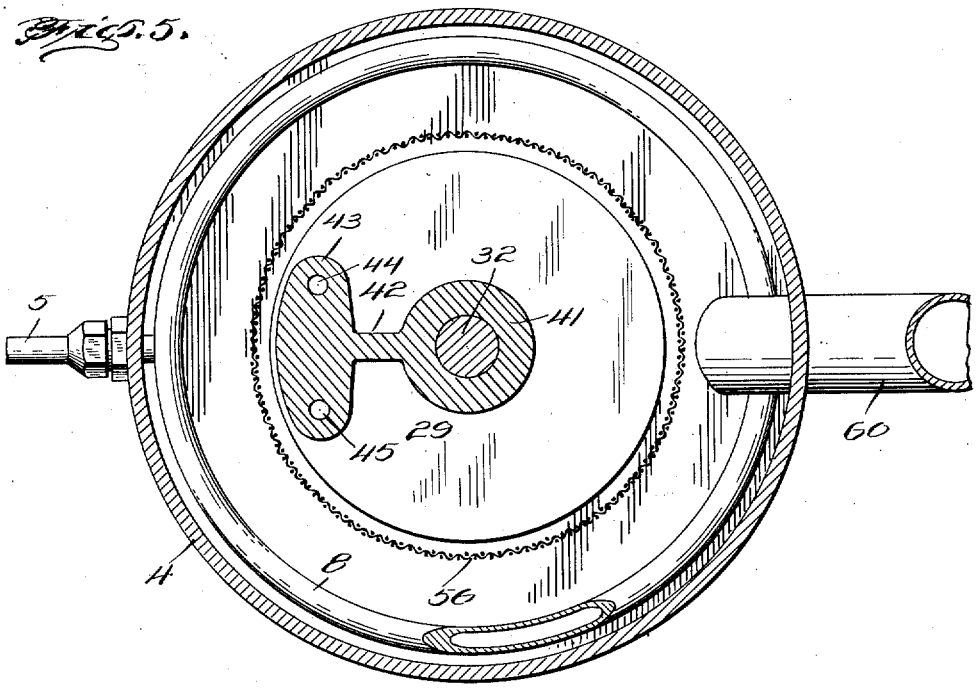
Figure 6:
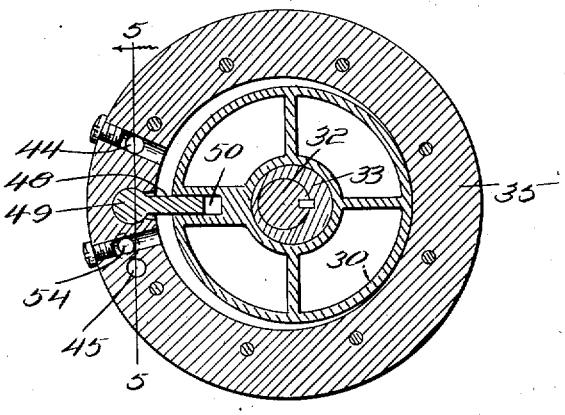
Figure 9:
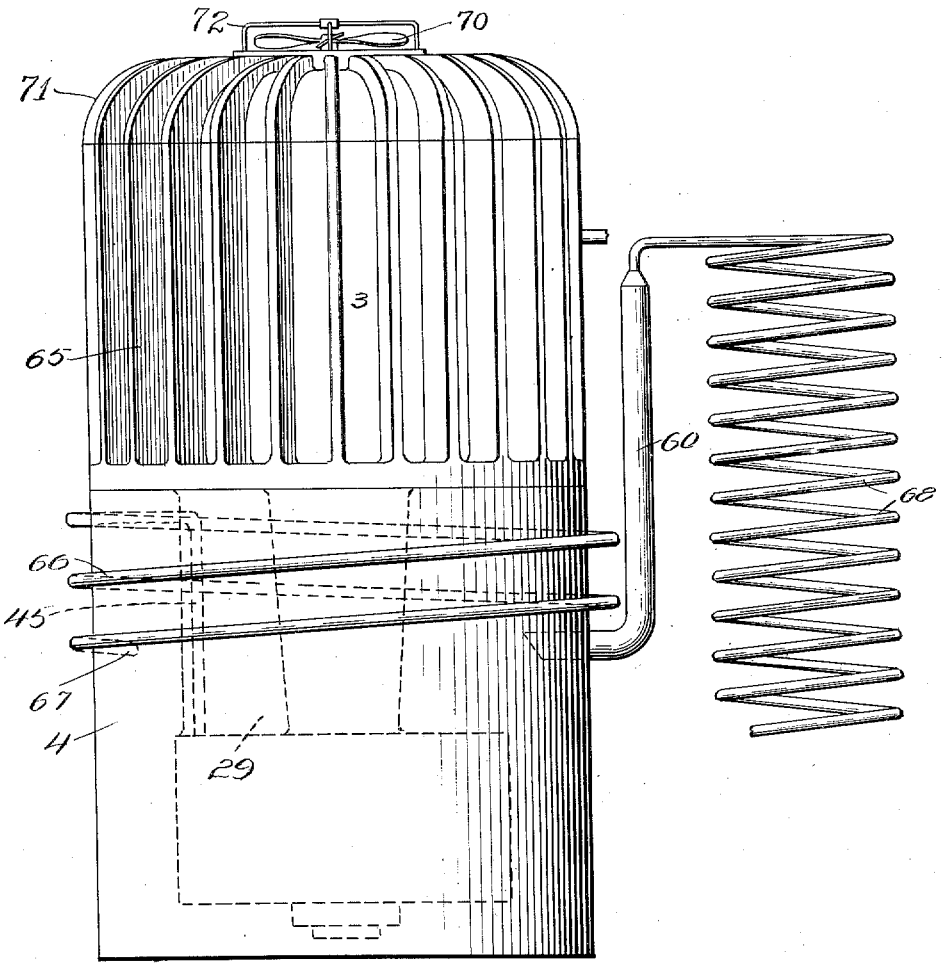

The construction of the apparatus of my invention will be more clearly understood from the specification hereinafter following by reference to the accompanying drawings, in which:

Figure 1 shows a part of the refrigeration system and the relative arrangement therein of the refrigeration apparatus of my invention; Fig. 2 is a fragmentary view illustrating that portion of the system which is disposed within the cooling chamber in proximity to a storage chamber where products are to be maintained at a constant low temperature; Fig. 3 is a cross-sectional view taken through the rotary driving and compressing apparatus used in the refrigeration system; Fig. 4 is a cross-sectional view taken on line 4—4 of Fig. 3 through the rotary driving apparatus which forms the upper compartment of the refrigeration apparatus illustrated in Fig. 3; Fig. 5 is a cross-sectional view taken on line 5—5 through the lower compartment of the refrigeration apparatus illustrated in Fig. 3; Fig. 6 is a cross-sectional view taken on line 6—6 of Fig. 3 through one of the stages of the compressing mechanism employed in the refrigeration system; Fig. 7 is a detailed cross-sectional view illustrating the arrangement of the intake and outlet ports in the driving apparatus; Fig. 8 is a cross-sectional view through the exhaust port taken on line 8—8 of Fig. 7; and Fig. 9 is a view showing an air cooled machine constructed in accordance with my invention.

Referring to the drawings in detail the refrigeration apparatus comprises a unit designated by reference character 1 which may be located in any convenient place with reference to a cabinet refrigerator 2. The refrigeration apparatus includes a driving mechanism and a compressing mechanism. The driving apparatus forms in itself a compartment designated by reference character 3, while the compressing mechanism is disposed within a portion of a condenser compartment 4. The refrigeration apparatus may be either water cooled or air cooled but in Fig. 1, I have shown the system through a connection 5 leading to a condenser shown more clearly in Fig. 3 by reference character 8, the cooling water passing from the condenser coils 8 and into connection 9 from which it is led to water jacket 10 which surrounds the compartment 3 formed by the driving apparatus. The waste water is delivered through connection 11. A pipe line 12 conducts the refrigerant through the upper cover 14 of the compartment 3 formed by the driving mechanism. Liquid refrigerant is delivered by the refrigeration apparatus to a pipe line 15 as will be more fully hereinafter described to the cooling system mounted within the refrigerator 2. Liquid refrigerant is maintained at a predetermined level in tank 16 by a suitable float valve control mechanism 17 and is supplied through a pipe line 18 to the evaporator cooling system or boiler 19. Heat is absorbed by the liquid refrigerant in the evaporator absorber or cooling tank 19 from food products or other contents within the chest of the refrigerator 2 and the refrigerant returned as a gas through pipe line 12 to the refrigeration apparatus. All pipe line connections in the apparatus are well packed as indicated at 5a, 9a, 9b, 11a and 12a to insure against leakage.

Referring more particularly to Figure 3 of the drawings it will be observed that conventional stuffing boxes as heretofore required in refrigeration machines, have been eliminated in my design of refrigeration apparatus together with all the inherent disadvantages of such stuffing boxes. In eliminating the stuffing boxes from the refrigeration apparatus I provide a casting 20 formed along a longitudinally extending vertical axis and having an upper bell which forms with the field and armature of the motor comprising the driving mechanism, a gas tight compartment closed by the cover 14 which is suitably secured against the upper part of compartment 3 with a suitable gasket 23 between the annular flanges 21 and 22. The driving mechanism forms a part of the compartment inasmuch as the armature 24 and field 25 are subjected at all times to the gaseous refrigerant which may pass from the line 12 through the space intermediate the armature and the field and through the space between the frame of the driving mechanism and the inside walls of the compartment as provided by the inwardly directed longitudinal extending ribs 26. The ribs 26 center the field of the motor within the compartment. By this arrangement the gaseous refrigerant passes from the line 12 in a downward direction through the annular gap 27 and the ports 28.

The casting 20 is provided with a downwardly extending end bell 29. The extended casting 29 has the compressing mechanism mounted on the lower end thereof. The compressing mechanism may consist of one or more stages. I have illustrated a compressor having a pair of compressor members 30 and 31 actuated by the extended shaft 32 which is directly connected with the armature 24 of the driving mechanism. The shaft 32 carries eccentrics 33 and 34 disposed at 180 degrees with respect to each other and mounted within each of the compressor members 30 and 31 in such manner that upon rotation of the extended shaft 32 an oscillatory or partially reciprocal motion is imparted to the compressor members 30 and 31. The compressor members 30 and 31 are mounted within chambers 35 and 36 spaced by the separator 37. The chamber 35 is mounted directly adjacent the end of the bell 29 while the lower extremity of chamber 36 is closed by the end plate 38.

The long extended casting which comprises the bell 29 serves as means for securing an oil seal for separating the high and low pressure areas of the refrigeration apparatus. The extended shaft 32 is journaled in bearings 39 and 40 at opposite ends of the extended casting 29. There is a slight clearance along the entire length of the shaft 32 between the walls of the extended bore 41 in the casting 29, which allows oil or lubricant to pass along the shaft 32 providing both automatic lubrication for the refrigeration apparatus and establishing an oil seal or an automatic stuffing box between the high and low pressure sides of the system as will be more fully pointed out hereinafter. The extended casting 29 is formed with a web portion 42 interconnecting the bore portion 41 in which shaft 32 is journaled and a portion 43 in which is integrally cast the extended ports 44 and 45 being the suction from the motor compartment and the discharge to the condenser compartment respectively. By the provision of the integrally cast suction and discharge passages in the casting 29 I eliminate the many disadvantages accruing from the use of pipe lines and the packed joints in the suction and discharge passages which have heretofore been necessary in refrigeration apparatus. The suction passage 44 leads to each of the compression chambers 35 and 36 for conducting gaseous refrigerant through the entrances 46 and 47 shown more clearly in Fig. 7 to the compressor members 30 and 31. The compressor members 30 and 31 by virtue of the motion imparted to them by rotation of the eccentrics 33 and 34 on the shaft 32 are moved upon members 48 which rock in the side walls of the chambers 35 and 36 as represented at 49. As shown more clearly in Fig. 6 the members 48 comprise vanes having a portion which extends into a slot 50 formed in the compressor members. The compressor members 30 and 31 while free to oscillate and to have partial rotation or reciprocal motion do not rotate but serve to compress the gaseous refrigerant to a pressure corresponding to the temperature of liquefaction.

With my compressor in operation I have successfully obtained and maintained pressures equal to 175 pounds gauge per square inch, equivalent to 190 pounds absolute pressure without reaching the limits of the compressing mechanism. While these pressures were being maintained I secured on the suction side a vacuum pressure corresponding approximately to 28 inches of mercury. In each of the chambers 35 and 36 I provide a spring pressed valve 51 interposed in each of the discharge ports 52 and 53 which operate to close the passages 54 and 55 intermediate the compression strokes of the compressor members 30 and 31. It will be observed that the ports in each of the chambers 35 and 36 and separator plate 37 are aligned with the suction and discharge ports in the casting 29. The refrigerant compressed to a pressure equivalent to liquefaction is conducted along the port or passage 35 and discharged into the compartment 4 at a point adjacent the lower wall of the low pressure compartment as represented by the discharge pipe 55. Surrounding the downwardly extending casting 29 and the compressing mechanism I provide a cylindrical screen 56 of relatively fine mesh which serves to separate oil or lubricant from the refrigerant discharged at 55. It will be noted that the refrigerant is discharged at a point within the screen so that oil or lubricant exhausted by the compressor will be caught in a film on this screen where it trickles down the sides of the screen to the oil level 57 within the container 4. In order to insure against the passage of oil or lubricant into the refrigeration system I place an additional screen 59 about the end of the gravity oil separator 60 which extends into the compartment 4. It will be observed that the inwardly projecting end of the gravity oil separator 60 is disposed at an angle 61 with respect to the vertical in such manner that oil which is caught on the screen 59 tends to trickle off and discharge into the oil reservoir in the lower part of the compartment 4. The screen 56 is suitably apertured about the base thereof as represented at 62 to permit the passage of oil freely along the bottom of the compartment 4. This arrangement enables me to provide automatic and self-lubrication for the refrigeration apparatus. The compartment 4 is under high pressure during the operation of the refrigeration apparatus. The motor housing is in a condition of low temperature. There is a normal tendency, therefore, for the pressure in compartment 4 to exert such effect upon lubricant in the lower part of compartment 4 that the lubricant is forced upwardly through apertured member 63 and along the sleeve bearing 41 progressively feeding into the low pressure motor housing. In this manner both bearings 39 and 40 are continuously lubricated. The lubricant which is forced into the low pressure motor housing returns along the suction passageway 44 and automatically lubricates the compressor mechanism in its entirety. As heretofore explained, oil which may be discharged by the compressing mechanism is not carried along with the refrigerant but is extracted therefrom by the screening means 56, 59 and the gravity oil separator 60. The compartment 4 is continuously cooled by means of the cooling coils 8 and the refrigerant liquefied. The refrigerant seeks a level approximately as represented at line 5—5 in Fig. 3. The refrigerant is forced under pressure through the gravity oil separator 60 wherein the tendency of any oil which may by chance have been carried along with the refrigerant is to return to the lower part of compartment 4.

As heretofore explained the refrigerant in the form of a liquid passes along the supply line 15 to be usefully employed for the extraction of heat and is returned to the low pressure motor housing through pipe line 12 for a repetition of the cycle.

It is to be understood that the apparatus of my invention may employ various kinds of refrigerants such as ethyl chloride, methyl chloride, sulphur dioxide, carbon dioxide and others. I have used with marked success, however, the refrigerant ethyl chloride and have obtained temperatures as low as 20 degrees F. below zero.

By my arrangement of refrigeration apparatus wherein the refrigerant actually passes through the moving parts of the driving mechanism, the driving motor is maintained at a desirably low temperature even under conditions of use over extended periods of time. In the event that liquid refrigerant should be returned through the suction line 12, the refrigerant will be subjected to the mild temperature or heat of the motor armature 24 which will at once convert the liquid refrigerant into a gas and facilitate the elimination of liquid refrigerant from the compressing mechanism. The expansion of the liquid refrigerant into a gas in direct contact with the motor windings further reduces the temperature at which the motor operates.

Connections for the driving motor are brought out through leads 64 through any convenient part of the frame of the apparatus. I have shown terminal posts 65 provided for connecting the driving motor to the power supply system. While I have not illustrated any electrical control circuits for the driving mechanism I desire that it be understood that any suitable method of automatic control and regulation of the motor circuit and also the water supply system may be employed. That is to say, the motor may be operated and water supplied to the cooling system only during periods that temperature conditions actually demand the supply of refrigerant to the cooling or expansion tank 19.

I have illustrated the water cooled refrigeration system in the drawings, but it will be understood that my invention is equally applicable to an air cooled system as represented in Fig. 9. In this construction the upper bell 3 is ribbed as represented at 65. It will be observed that the fan projects for a sufficient distance above the head 71 in order to provide for circulation of air over the casing. A suitable wire guard 72 is provided to prevent articles from being dropped into the path of the blades of the fan 70. The lower casing 4 encloses the depending casting 29. The discharge port 45 instead of exhausting at a point directly within the chamber 4 is connected to an external cooling coil 66 disposed about the outside walls of the chamber 4, from which coil it exhausts to the interior of the chamber 4 at a point represented at 67. The gaseous or liquefied refrigerant is conducted through the gravity oil separator 60 as heretofore explained. The refrigerant passes through an auxiliary coil 68 before reaching the line 15. The purpose of the addition of the auxiliary coil is to more fully insure the liquefaction of the refrigerant by cooling.

It will be observed that the lubricant is forced in a continuous cycle in a direction up the shaft 32, thence down the suction line and finally in spray with the refrigerant under pressure. As heretofore explained this method of lubrication insures long life to the apparatus. It will be observed that the compressor is normally submerged or partially submerged in the lubricant and due to the pressure in the condensing chamber there is a constant tendency for the lubricant to be forced upwardly around shaft 32. Furthermore due to the fact that high pressure exists about the compressing mechanism, there is no tendency for outward leakage to take place from the compressor, and gaskets therefore become unnecessary. The advantages of passing the refrigerant through the moving parts of the driving mechanism have already been pointed out. It will be understood that the windings for the motor are carefully protected to resist chemical action of the refrigerant. The insulation on the conductors forming the motor windings is impregnated with suitable insulation material and the windings may be soaked in Bakelite or other chemical and electrical resistant material. I have successively operated the motor over long periods in the presence of the refrigeration gases without detriment to the moving parts. The mounting of the motor on a bearing which is wholly below the driving parts enables the motor to be continuously lubricated which would not be possible in the event that a top bearing was provided.

While I have described my invention in certain particular embodiments, I desire that it be understood that modifications may be made and that I intend no limitations upon the invention other than those imposed by the scope of the appended claims.

What I claim and desire to secure by Letters Patents of the United States is as follows:

1. A refrigeration apparatus comprising in combination a compressing mechanism, a driving mechanism, a housing enclosing said driving mechanism and having a depending portion thereon supporting said compressing mechanism, said driving mechanism comprising a motor, an extended shaft on said motor journaled in said depending portion and connected with said compressing mechanism, a condensing chamber surrounding said depending portion, means for cooling said condensing chamber, a port in said depending portion connecting said housing with said compressing mechanism, port means connecting said compressing mechanism with said condensing chamber, means permitting gaseous refrigerant to flow through said driving mechanism in said housing, whereby said compressing mechanism operates to force said refrigerant, under pressure, into said condensing chamber for liquefying said refrigerant, and means for utilizing said refrigerant for absorbing heat.

2. A refrigerating apparatus comprising in combination a casting having an extended vertical axis and formed with a bell at the upper end thereof and a downwardly depending extension, driving mechanism including a driven member and a stationary member with a gap therebetween forming a part of said bell, said driving mechanism having an extended shaft journaled in said depending extension, a compressing mechanism supported on the lower extremity of said depending extension and driven by said shaft, a condensing chamber surrounding said depending portion, port means interconnecting said bell and said compressing mechanism, an inlet port in said bell whereby gaseous refrigerant may be conducted through the gap formed between said driven member and said stationary member of said driving mechanism and said ports to said compressing mechanism and delivered under pressure to said condensing chamber, and means for distributing liquefied refrigerant to a heat absorber for lowering the temperature of said heat absorber.

3. In a refrigeration apparatus the combination of a vertically extending casting, an enclosed driving mechanism carried by one end of said casting and sealed to atmosphere, said driving mechanism including a rotor and a stator separated by a gap, a compressing mechanism carried by the other end of said casting, a shaft journaled in said casting and connected with said driving mechanism for driving said compressing mechanism, condensing means surrounding said compressing mechanism, means for introducing gaseous refrigerant through the gap between said rotor and stator of said enclosed driving mechanism, means for passing said refrigerant to said compressing mechanism carried by said casting, and means for delivering said refrigerant under pressure from one side of said casting and within said condensing means, whereby liquid refrigerant may be distributed to a heat absorber.

4. A refrigeration apparatus comprising in combination supporting means including a bell shaped housing, an integral portion downwardly depending from said housing, driving apparatus arranged in said housing and sealed to atmosphere, said driving apparatus including a rotor and a stator separated by a gap, compression mechanism carried by the extremity of said integral portion, a condenser surrounding said compression mechanism, intake and discharge ports positioned in said integral portion said intake port connecting said housing and said compression mechanism, said discharge port leading to said condenser, and means for delivering gaseous refrigerant to said housing for passage through the gap formed between said rotor and stator of said driving apparatus, said intake port, said compression mechanism and said discharge port, whereby refrigerant of high pressure may be secured.

5. A refrigeration apparatus comprising in combination a sealed case including a condenser and a reservoir for liquid refrigerant, a casting closing the top of said case, an enclosed motor including a stator and rotor separated by a gap, said motor being mounted on said casting, an extended portion formed on said casting and entering said sealed case, a compression mechanism carried on the extremity of said casting, a shaft journaled in said extended portion and interconnecting said motor and said compression mechanism, whereby gaseous refrigerant may be passed between said stator and rotor and delivered under condensing pressure from said compression mechanism.

6. In a refrigeration apparatus the combination of a compressing mechanism, a driving mechanism, and a condenser for refrigerant, said driving mechanism comprising an electric motor having rotor and stator elements, a casing enclosing said rotor and stator elements, said casing having a laterally extending flange forming a cover for said condenser and sealing said condenser against leakage of high pressure refrigerant therein, with a gap formed between the rotor and stator elements of said electric motor for conveying refrigerant to said compressing mechanism and simultaneously cooling said driving mechanism.

7. A refrigeration apparatus comprising in combination a compressing mechanism, a driving mechanism including a driven rotor and a stator separated therefrom by a gap, a shaft connecting said driving mechanism with said compressing mechanism, a condenser for refrigerant, a casing for said driving mechanism, said casing having an intermediate flange thereon forming a closure for one side of said condenser and sealing said condenser against leakage of high pressure refrigerant therein, lubricating means in said condenser and means whereby said high pressure refrigerant effects distribution of said lubricant through a continuous cycle along said shaft between said driving and compressing mechanism in an upward direction, said refrigerant being directed through the gap between said rotor and stator elements in the course of its passage to said condenser.

8. In a refrigeration apparatus the combination of a vertically arranged driving mechanism including rotor and stator elements with a gap formed therebetween, a compressing mechanism, a shaft interconnecting said driving mechanism with said compressing mechanism, a casing surrounding said shaft and enclosing said mechanism, said gap providing a passage for refrigerant through said driving mechanism to said compressing mechanism for continuously cooling said rotor and stator elements, a condenser containing lubricant in which said compressing mechanism is partially submerged, said compressing mechanism operating to discharge high pressure refrigerant into said condenser for creating high pressure therein, whereby said lubricant within said condenser is forced in a continuous cycle along said shaft in an upward direction through said driving mechanism and said compressing mechanism within said casing.

9. In a refrigerating apparatus the combination of a vertically arranged driving mechanism including rotor and stator elements separated by a gap, a compressing mechanism, a condenser surrounding said compressing mechanism, a rotary shaft, a casing surrounding said shaft and enclosing said mechanism, a reservoir for lubricant in said condenser, said driving mechanism being arranged for the conveyance of refrigerant through the gap between the rotor and stator elements of said mechanism to said compressing mechanism for discharge into said condenser for developing such pressure within said condenser that said lubricant is automatically forced through said mechanisms in a continuous cycle along said rotary shaft in an upward direction within said casing.

10. In refrigeration apparatus, the combination of a driving mechanism, said driving mechanism including a rotor and a stator with a gap therebetween, a compressing mechanism actuated by the driving mechanism, an expansion system for refrigerant, a condenser, means defining with one end face of the driving mechanism a chamber for uniformly distributing expanded refrigerant circumferentially to one end of the driving mechanism before passage of said expanded refrigerant through the driving mechanism, and means for conveying refrigerant from the expansion system to said distributing chamber, said compressing mechanism having an inlet located to withdraw refrigerant from the opposite end of the driving mechanism and said driving mechanism having its rotor and stator directly interposed in the path of said refrigerant and arranged to provide a substantially longitudinal passageway for said refrigerant in its passage from said distributing chamber to said compressing mechanism inlet, whereby the driving mechanism is uniformly subjected to the cooling influence of an expanded refrigerant.

11. In refrigeration apparatus, the combination of a driving mechanism, said driving mechanism including a rotor and a stator with a gap therebetween, a compressing mechanism actuated by said driving mechanism, means defining a casing for enclosing said driving mechanism and compressing mechanism, a plurality of radially positioned ribs formed on the interior walls of said enclosing means for positioning said stator element and for providing longitudinally-extending ports between the interior walls of said enclosing means and said stator element, an expansion system for refrigerant, a condenser, means defining with one end face of the driving mechanism a chamber for uniformly distributing expanded refrigerant circumferentially to said one end face of the driving mechanism before it enters the gap and ports, means for conveying refrigerant from the expansion system to the distributing chamber, said compressing mechanism having an inlet located to withdraw refrigerant from the opposite end of the driving mechanism and said driving mechanism having its rotor and stator directly interposed in the path of the refrigerant, so that said gap and longitudinally-extending ports provide substantially longitudinal and annular passageways for said refrigerant in its passage from the distributing chamber to the compressing mechanism inlet, whereby the stator and the rotor are uniformly subjected to the cooling influence of an expanded refrigerant about their circumferences.

12. In refrigeration apparatus, the combination of a driving mechanism, said driving mechanism including a rotor and a stator with a gap therebetween, a compressing mechanism actuated by the driving mechanism, an expansion system for refrigerant, a condenser, means defining with one longitudinal end of the driving mechanism a chamber for uniformly distributing expanded refrigerant circumferentially to said end of the driving mechanism before passage of said expanded refrigerant through the driving mechanism and means for conveying refrigerant from the expansion system to said distributing chamber, said compressing mechanism being disposed and having an inlet at the opposite longitudinal end of the driving mechanism from said one longitudinal end thereof, and said driving mechanism having its rotor and stator directly interposed in the path of said refrigerant and arranged to provide a substantially longitudinal passageway for said refrigerant in its passage from said distributing chamber to said compressing mechanism inlet, whereby the driving mechanism is uniformly subjected to the cooling influence of an expanded refrigerant.

OSBORNE I. PRICE.